Aug. 13, 1968     H. F. HILLSTROM     3,396,704
HOT-WATER BROODER UNIT

Filed July 8, 1966                                          2 Sheets-Sheet 1

INVENTOR.
HUGO F. HILLSTROM
BY *Merchant & Gould*
ATTORNEYS

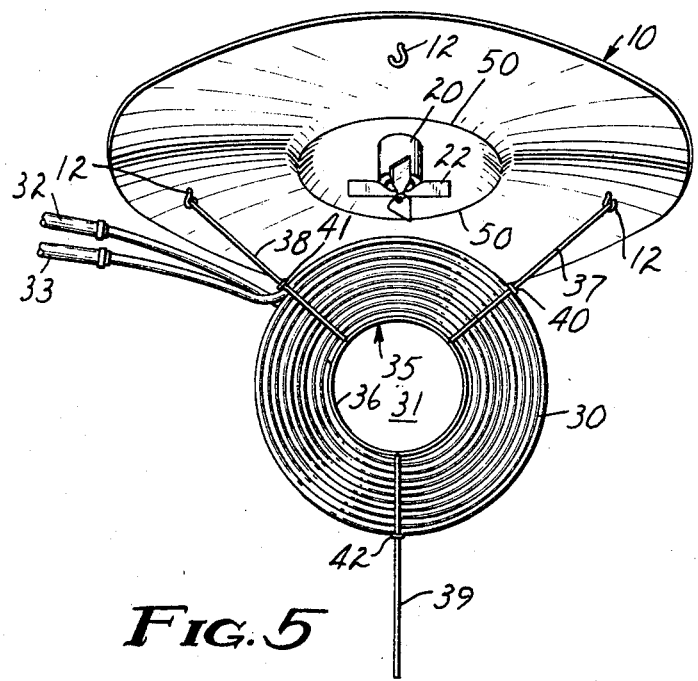
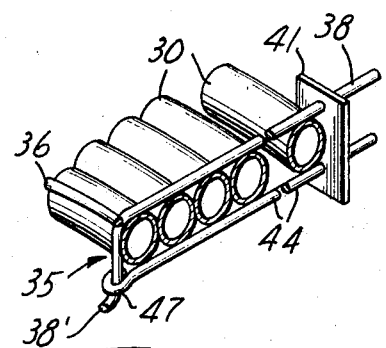
FIG. 4
FIG. 5
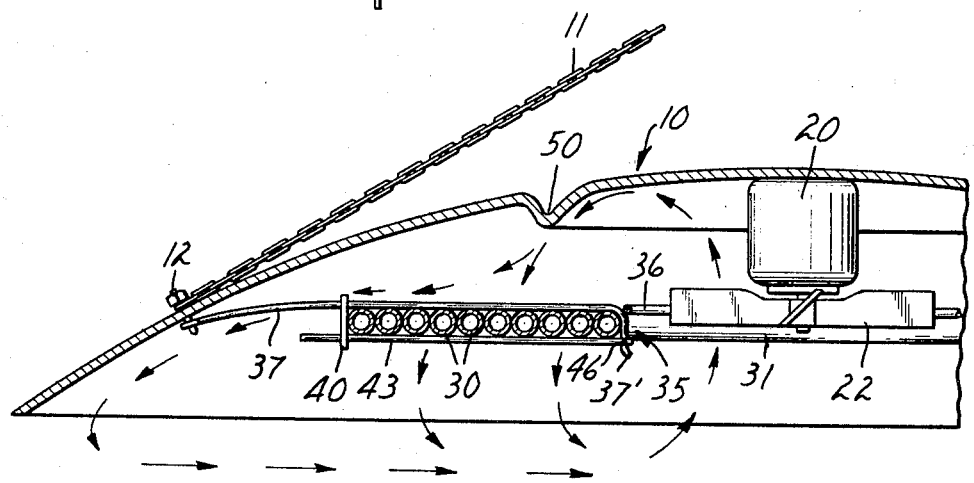
FIG. 3
INVENTOR.
HUGO F. HILLSTROM
BY
Merchant & Gould
ATTORNEYS United States Patent Office 3,396,704
Patented Aug. 13, 1968

3,396,704
HOT-WATER BROODER UNIT
Hugo F. Hillstrom, Rte. 2, Box 12,
Cokato, Minn. 55321
Filed July 8, 1966, Ser. No. 563,732
3 Claims. (Cl. 119—31)

ABSTRACT OF THE DISCLOSURE

A hover formed generally in the shape of a portion of a hollow sphere with no openings therein having a fan mounted approximately centrally thereunder and a plurality of hot-water coils in a generally helical shape mounted substantially coaxially around the fan. The hover has a downwardly projecting discontinuity integrally formed therein so that air is drawn upwardly in the center of the brooding unit by the fan is deflected generally outwardly and downwardly by the hover across the hot-water coils after which the air circulates back toward the center of the brooding unit and is drawn upwardly again by the fan.

---

This invention pertains to a hot-water brooder unit and more specifically to brooders in which air circulated over hot-water coils is retained in the general area thereunder.

In prior art brooders and especially hot-water brooders a hover or canopy, comprised of a metal or the like, is formed into a portion of a hollow sphere with a centrally located opening therein. This hover is mounted in spaced relationship with the floor of an enclosure and serves as a shelter for baby birds and animals, such as baby chickens. A fan is mounted in the opening in the hover to draw air from the surrounding area and circulate it downwardly therethrough. Hot-water coils are located below the hover and a second member, which is formed into a portion of a generally spherical shape, is mounted beneath the hover and the hot-water coils approximately parallel with the hover. As the fan forces air down through the opening in the hover, the second member diffuses the air outwardly through the hot-water coils and to a relatively large area immediately beneath and surrounding the hover. Since the fan continues to draw fresh air from above the hover and force heated air out of the bottom of the hover all of the air within the enclosure containing a brooder of this type will continue to circulate and be heated by the brooder. This heating of all the air in the enclosure results in a large amount of lost heat because it is utilized to increase the temperature of a large quantity of unused air space. Therefore, the cost of operating brooders of this type is excessively high.

In the present brooder unit, a hover or canopy constructed from metal, heat resistant plastic, or the like is formed into a portion of a sphere with no openings for the circulation of air therein. A fan is mounted approximately centrally below the hover so that the fan blades are spaced from the lower surface thereof. Hot-water coils are then fixedly attached to the hover concentric with the fan and spaced from the undersurface of the hover. The fan draws air up through the center of the hot-water coils and causes the air to deflect generally radially outwardly from the undersurface of the hover. Diverting means, which may be an air diverting ring fixedly attached to the underside of the hover or a discontinuity in the undersurface of the hover, divert the air downwardly over the hot-water coils toward the floor or other surface immediately below the brooder. This air is then drawn upwardly again by the fan to be recirculated over the hot-water coils. Thus, the present brooder is designed to recirculate the air immediately below the hover rather than throughout the entire enclosure containing the brooder.

Thus, except for minor convection currents produced at the outer edges of the brooder and other minor heat loses, all of the heat supplied to the hot-water coils in the present brooder is utilized to heat the air immediately beneath the hover. Since the fan associated with the present brooder does not circulate air throughout the enclosure containing the brooder the entire enclosure is not heated and there is a substantial saving in operating costs. Also, the present brooder operates more efficiently because the air circulating over the hot-water coils is still at a relatively high temperature from the previous cycle and, therefore, does not require as much heat to raise it to the desired temperature. Because of minor convection currents around the outer edges of the brooder and other slight exchanges at the edges thereof, the air beneath the hover is always sufficiently fresh for the baby animals or birds beneath the hover.

It is an object of this invention to provide a new and improved hot-water brooder unit.

It is a further object of the present invention to provide a hot-water unit in which the air only within the immediate area of the brooder is circulated and heated.

It is a further object of the present invention to provide a hot-water brooder unit with a greatly improved efficiency.

It is a further object of the present invention to provide a hot-water brooder unit which is simpler to produce and maintain.

These and other objects of this invention will become apparent to those skilled in the art upon consideration of the accompanying specification, claims and drawings.

Referring to the drawings, wherein like characters indicate like parts throughout the figures:

FIG. 3 is a sectional view as seen from the line 3—3 in FIG. 2;

FIG. 4 is a detailed view in perspective illustrating the means for mounting the hot water coils; and FIG. 5 is a view in perspective somewhat diminished in size of the device illustrated in FIG. 1 illustrating the cleaning position.

Figure 1:
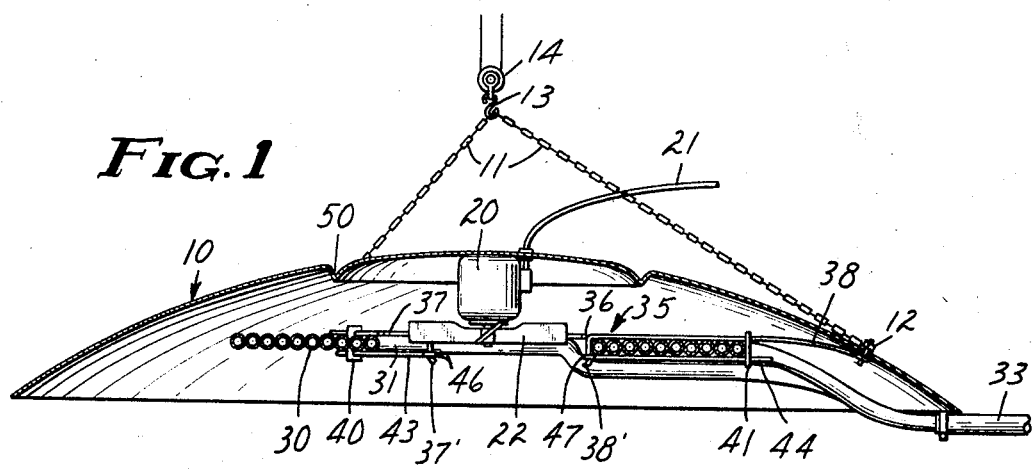
FIG. 1 is an axial sectional view of the present hot water brooder unit.
Figure 2:
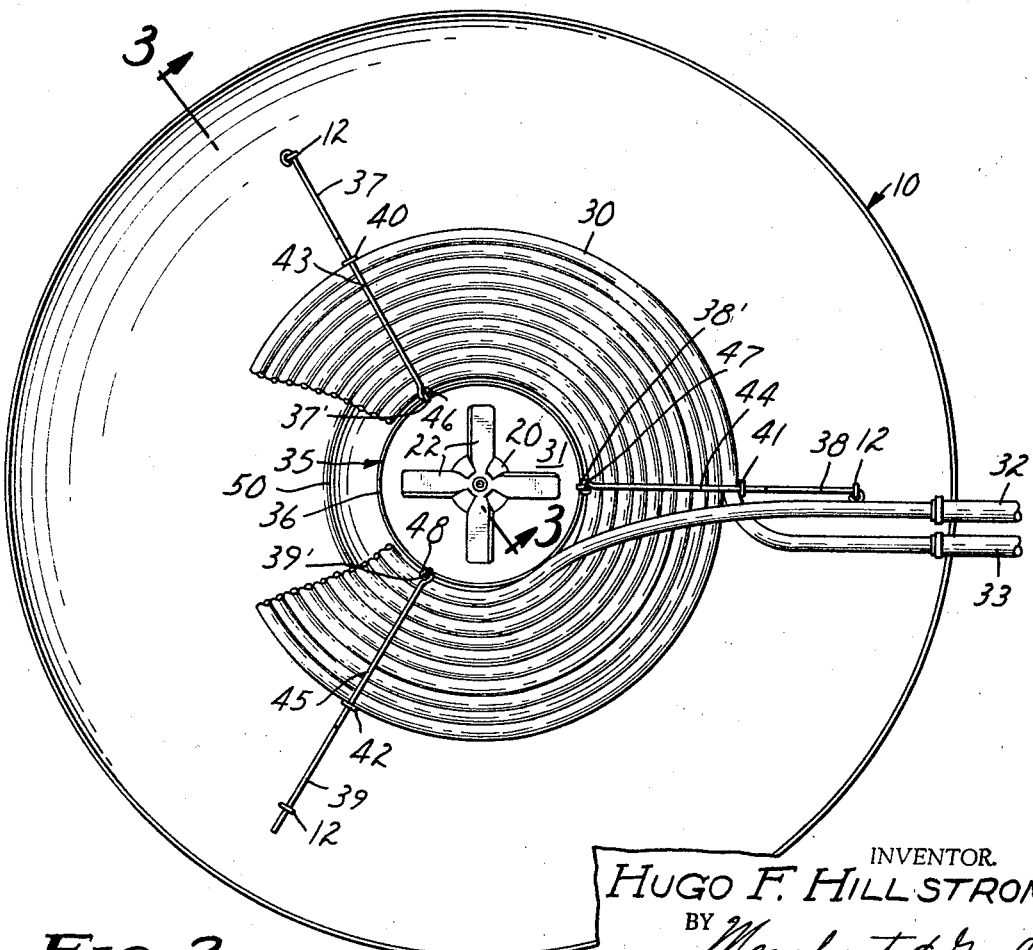
FIG. 2 is a view in bottom-plan of the device illustrated in FIG. 1.

In the figures the numeral 10 designates a hover or canopy formed generally in the shape of a portion of a hollow sphere. The hover 10 is adapted to be mounted with its circular edge horizontal and spaced from the floor of an enclosure such as a brooder house or the like. In the present embodiment the hover 10 is hung from three chains 11, each of which has one end attached to the upper surface of the hover 10 by a bolt 12 at approximately equally spaced apart intervals and the other end of each of the chains 11 is engaged over one end of a steel S-hook 13. The other end of the S-hook 13 is engaged in a light block and tackle 14 which is utilized to raise and lower the hover 10 for cleaning purposes and to increase the spacing between the hover 10 and the floor as the animals or birds, such as chickens and the like, thereunder increase in size. The mounting means including chains 11, S-hook 13 and block and tackle 14 are illustrated for explanatory purposes and might vary considerably while still coming within the scope of this invention.

A fan motor 20 is fixedly attached to the undersurface of the hover 10 at approximately its axial center so that the output shaft is extending downward. The leads 21 through which the motor 20 is energized extend through an opening in the hover 10 and to a suitable source of power. The opening in the hover 10 is sufficiently large to allow the leads 21 to pass therethrough but does not allow any substantial quantities of air to circulate therethrough. The leads 21 are encompassed by a gromet as they pass through the opening to protect them from wear on the edges of the hover 10. A fan blade 22 is fixedly attached to the output shaft of the motor 20 for rotation therewith and rotates in an approximately horizontal plane spaced from the undersurface of the hover 10. The fan blade 22 is oriented so that it rotates in a direction to draw air upwardly from the floor of the enclosure and forces it toward the undersurface of the hover 10 when the motor 20 is properly energized.

In the present embodiment a hot water coil 30 is formed from some material which can easily be formed into a coil and which will radiate the heat from the hot water flowing therein, such as copper or the like. The coil 30 is formed from a single piece of tubing which is wound in the form of a spiral and contained in a single plane. An opening 31 at the center of the coil 30 has a diameter somewhat larger than the length of the fan blade 22 and the outer diameter of the entire coil 30 is somewhat greater than one-half the diameter of the hover 10 at the lower circular edge. A pair of flexible tubes 32 and 33 are connected to either end of the hot water coil 30 and to a suitable source of hot water. The flexible tubes 32 and 33 should have a sufficient length so that the hover 10 can move vertically within the enclosure for cleaning and the like.

The hot water coil 30 is maintained in the correct position and mounted to the hover 10 by a wire framework generally designated 35. The framework 35 consists of a centrally located ring 36 having a diameter slightly smaller than the inner spiral of the hotwater coil 30. The ring 36 has three rods 37, 38 and 39 fixedly attached thereto by welding or the like. The three rods 37, 38 and 39 extend radially outwardly from the ring 36 somewhat past the bolts 12 at approximately equally spaced apart intervals. Each of the bolts 12 has a hook integrally attached thereto and extending generally downwardly from the undersurface of the hover 10. One end of each of the three rods 37, 38 and 39 is engaged through one of the hooks on the bolts 12 and the ends of the rods 37 and 38 are turned over to form eyes or rings which are engaged over the hooks on the bolts 12. The end of the remaining rod 39 is not turned over but simply passes through the center of the hook at the end of the bolt 12 and is disengageable therefrom.

The opposite ends 37', 38' and 39' of each of the rods 37, 38 and 39 extend axially downwardly from the ring 36 a distance somewhat greater than the diameter of the tubing making up the coil 30 and the extreme end is turned slightly inwardly toward the center of the ring 36. Three flat generally rectangular shaped plates 40, 41 42 having two spaced apart holes therethough with a diameter approximately equal to the diameter of the rods 37, 38 and 39 are slidably engaged over the rods 37, 38 and 39, respectively, by means of one of the holes. The plates 40, 41 and 42 are positioned so that the other hole in each of the plates is positioned slightly below the coil 30. Three wire rods 43, 44 and 45 having a diameter approximately equal to the rods 37, 38 and 39 are each formed with an eye or a ring 46, 47 and 48, respectively, at one end. The rings 46, 47 and 48 at one end of the rods 43, 44 and 45 are engaged over the ends 37', 38' and 39' of the rods 37, 38 and 39. The opposition ends of the rods 43, 44 and 45 are engaged through the holes in the plates 40, 41 and 42. The diameter of the holes through the plates 40, 41 and 42 are close enough to the diameter of the rods 37–43, 38–44 and 39–45 so that the plates 40, 41 and 42 cannot be moved horizontally along the length of the rods 37, 38 and 39 unless they are maintained substantially perpendicular to the axial length thereof. Because the plates 40, 41 and 42 must be in a very specific position relative to the sets of rods 37–43, 38–44 and 39–45 before they can move horizontally there is a tendency for them to bind and remain in the position in which they are initially placed. Thus, the wire framework 35 maintains the hot water coil 30 in the desired form and simultaneously mounts it in the correct position below the hover 10. When the wire framework 35 is in the position described the coil 30 is maintained substantially concentric with the fan blade 22 so that air will be drawn up through the opening 31 and will strike the inner surface of the hover 10. While the hot-water coil 30 is illustrated as tightly wound spiral in a single plane it should be understood that the coil 30 might be formed in a variety of shapes, such as two coils in separate planes, a loosely wound spiral, etc., all of which come within the scope of this invention.

As the air is drawn upwardly through the opening 31 in the coil 30 it strikes the undersurface of the hover 10 and is deflected radially outwardly. As the air passes approximately above the coil 30 diverting means turns the air downwardly into the coil 30 so that it will be heated. In this embodiment the diverting means is in the form of a circular discontinuity 50 formed in the hover 10. The discontinuity 50 is a downwardly projecting portion of the hover 10 extending in a circle concentric with the coil 30 and having a diameter somewhat larger than the inner diameter of the coil 30 but smaller than the outermost diameter thereof. The discontinuity 50 is formed so that air traveling along the undersurface of the hover 10 is directed downwardly onto the coil 30 by an outwardly and downwardly directed ramp-like projection. It should be understood that the diverting means could be constructed in a variety of forms other than the discontinuity 50, such as a diverting ring having a shape substantially similar to the discontinuity 50 and attached to the undersurface of the hover 10, and all of these various forms come within the scope of this invention.

Thus, the fan blade 22 draws air from the floor of the enclosure up through the opening 31 and forces it outwardly along the undersurface of the hover 10. The diverting means 50 directs the air downwardly onto the coil 30 where it is heated and flows downwardly adjacent the floor of the enclosure. This heated air is then drawn inwardly along the floor of the enclosure and upwardly again into the fan blade 22. The general movement of the air under the hover 10 and over the coil 30 is illustrated by the arrows in FIG. 3. Thus, the air immediately beneath the hover 10 is heated by convection and radiation from the coil 30 but, since the fan blade 22 only circulates air beneath the hover 10, the remaining air within the enclosure is not heated. Because only the useful air immediately beneath the hover 10 is heated the above-described brooder is very economical to operate. In addition, because heat is transferred to the air from the coils 30 by radiation and convection the present brooder is also very efficient to operate. As illustrated in FIG. 5, the rod 39 may be disengaged from the bolt 12 and the entire coil 30 swung downwardly from beneath the hover 10 and the entire brooder can be quickly and easily cleaned with a simple brush.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:
1. A hot-water brooding unit comprising:
 (a) a hover adapted to be mounted in spaced relationship from chicken coop floors and the like;
 (b) a fan adapted to be connected to a suitable source of energization fixedly attached to said hover for drawing air from an area below the fan and adjacent the lower edge of said hover and directing the air upwardly against the underside of said hover;

(c) hot-water coils adapted to be connected to a suitable source of hot water fixedly attached to said hover approximately concentric with said fan for heating air circulated thereover; and (d) air diverting means positioned above said fan and forming a portion of said hover for diverting the air directed upwardly by said fan over said hot-water coils and into said area from which said fan draws air in a manner to maintain substantially all of the heated air circulating beneath said hover.

2. A hot-water brooding unit as set forth in claim 1 wherein said air diverting means is a downwardly projecting discontinuity integrally formed in the hover.

3. A hot-water brooding unit as set forth in claim 1 wherein the hover is formed in the shape of a portion of a hollow sphere with no openings therein for air to circulate through.

References Cited

UNITED STATES PATENTS

| | | | |
|---|---|---|---|
| 1,581,857 | 4/1926 | Morison | 119—31 |
| 1,732,139 | 10/1929 | Pascoe | 119—33 |
| 1,851,364 | 3/1932 | McFeeters | 119—33 |
| 1,871,554 | 8/1932 | Paul | 119—32 |

FOREIGN PATENTS

| | | |
|---|---|---|
| 685,968 | 5/1964 | Canada. |
| 610,331 | 9/1926 | France. |

HUGH R. CHAMBLEE, *Primary Examiner.*